April 4, 1961    K. M. NODOLF    2,978,066
GAS CLEANING APPARATUS
Filed May 7, 1959

INVENTOR.
KEITH M. NODOLF
BY
ATTORNEY

United States Patent Office 2,978,066
Patented Apr. 4, 1961

2,978,066

GAS CLEANING APPARATUS

Keith M. Nodolf, Minneapolis, Minn., assignor to Minneapolis-Honeywell Regulator Company, Minneapolis, Minn., a corporation of Delaware Filed May 7, 1959, Ser. No. 811,650

3 Claims. (Cl. 183—7)

The present invention is concerned with an improved electrostatic air cleaner; in particular, the electrostatic air cleaner has a collecting section made up of parallel, oppositely charged electrodes or plates, and one set of electrodes are coated with an insulating material to decrease the breakdown between the oppositely charged electrodes.

In a conventional electrostatic air cleaner, parallel, conducting, oppositely charged, adjacent plates of the collecting section are separated by suitable spacing means. During the operation of such a unit, the electrical breakdown between the adjacent oppositely charged plates is one factor which often limits the voltage level which can be used and thus the over-all air cleaning efficiency of the unit.

The present invention is concerned with a novel means for increasing the insulation characteristics between adjacent plates or electrodes presently achieved by spacing in air in an air cleaning apparatus.

An object of the present invention is to provide an improved gas cleaning apparatus.

Another object of the present invention is to provide in a gas cleaning apparatus an improved manner of insulating oppositely charged electrodes.

These and other objects of the present invention will become apparent upon a study of the specification and claims of which:

These and other objects will become apparent upon a study of the following specification.

Figure 1:
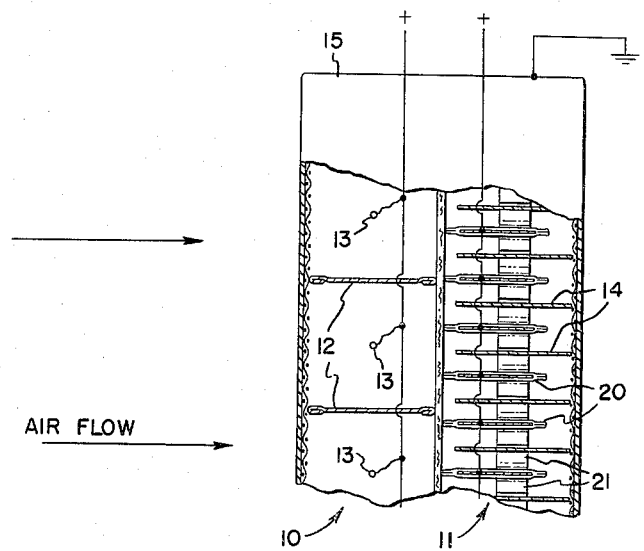
Figure 1 is a schematic showing of a gas cleaning apparatus having an ionization section and a collection section.

Referring to Figure 1, a schematic showing of an electrostatic gas cleaning apparatus is shown having an ionization section 10 and a collection section 11 through which air flows. The ionization section comprises a plurality of parallel, spaced plates 12 which are connected to one side of a source of power or ground. Strung in between the adjacent plates are ionizing wires 13 which are connected to the positive side of the source of power. As the air or gas passes through the ionization section the foreign particles are given a charge. The collection section comprises a plurality of conducting plates or electrodes 14 which are connected to the grounded frame 15. A plurality of conducting plates or electrodes 20 are connected to the opposite side or positive side of the source of power. The collection section comprises the two sets of electrodes which are alternately assembled so that every other electrode or plate is of the opposite charge, and a voltage difference exists between adjacent plates.

Figure 2:
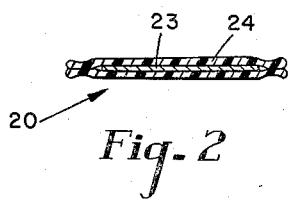
Figure 2 is a cross sectional view of the positively charged plate of the collection section shown in Figure 1.

While the plates are held at the ends which would be the top and bottom in Figure 1, a support is generally needed in between the supported extremities. The ground plate 14 has a plurality of ears 21 bent out as shown in more detail in Figure 3. The ears engage the adjacent oppositely charged plate 20. Plate 20 is shown in more detail in the cross sectional view of Figure 2. The plate is made up of thin conducting portion 23 which is coated by a dielectric or insulating material 24.

During the study of electrostatic gas cleaners, the inventor noticed that the majority of the foreign particles were collected on the negative plates or electrodes of the collecting section 11. A further analysis showed that a high percentage of the foreign particles ionized by the ionization section 10 received a positive charge. If this were not the case in every ionizer, many of the ionizers could be adapted to increase the amount of positive ionization. As the positively charged particles pass into the collection section 11, the particles are repelled by the positively charged plates and are attracted by the negatively charged plates. The particles would then collect on the negative plates.

Since the operation of the collection section depends upon the field established between the adjacent electrodes, and the majority of the particles are collected on the negative electrodes, insulation 24 was applied to the positive electrode or plate. Other tests showed that when current breakdown exists between adjacent electrodes in a high voltage charged unit, the current or spark propagates from the positive electrode. With the positive electrode coated by an insulating material, the conduction of current from the positive electrode is reduced, and thus flashover or breakdown between the adjacent electrodes is reduced.

Figure 3:
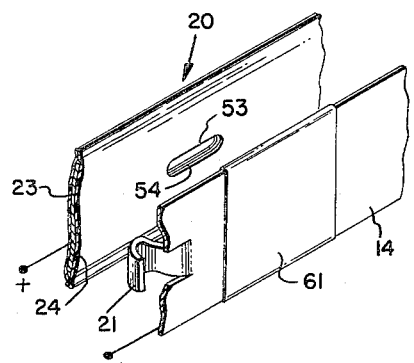
Figure 3 is a detailed showing of the collecting section of Figure 1.

The selection of the insulating material 24 is made with certain requirements in mind. To prevent the current flow between the adjacent oppositely charged electrodes, a high dielectric material is used. At the same time, to be sure the outer surface of the positively charged plates 20 has a positive charge, the resistivity of the insulating material 24 must be low enough to allow a certain amount of charge to leak to the outer surface of the insulating material 24. For example, with the spacer 21 as shown in Figure 3, an extremely high dielectric material 24 coating the electrode will result in the positively charged electrode becoming coated with negatively charged dirt. The actual voltage gradient will exist between the conducting portion 23 of the positive charged plate and the outer surface of the insulating material or across the thickness of the insulating coating 24. The outer surface of the insulating material 24 must be maintained at a positive charge.

One particular means of maintaining the positive charge is shown in the portion of the collecting cell of Figure 3. The positively charged plate 20 which comprises an inner conducting or metal portion 23 and an insulation cover 24 has space holes 53. The current flow from exposed edge 54 of metal plate 23 to the outer surface of material 24 maintains the plate surface at a positive charge. In order to decrease the possibility of flash over or voltage breakdown between the exposed edge 54 and adjacent ground plate 14, strips of insulating material or tape 61 are placed around the ground plate on the plate area adjacent holes 53. The strips of material 61 increases the distance between the plate 23 which is exposed at holes 53 and the uninsulated ground plate 14 to prevent "flash over" or voltage breakdown.

With the insulated plates, a reduction in the possibility of propagating a spark between the adjacent oppositely charged plates of the collecting cell is obtained, and the efficiency of the air cleaner is greatly increased since a higher voltage can be used to increase the voltage gradient between the adjacent plates.

While I have described the invention in a particular manner, I intend that this invention only be limited by the scope of the appended claims in which I claim:

1. In an electrostatic air cleaner a collection section for collecting charged foreign particles in the air comprising, a first set of thin conducting plates, said plates having a dielectric coating, a second set of thin conducting plates, said plates being assembled in a parallel manner with every other plate of the other set, a source of power, means connecting said source whereby said first and second set have a voltage difference between them, and means spaced from the edges of each of said first set of plates and providing a current flow path of lower resistance than through the coating for conducting a current from each plate to an outer surface of said coating to maintain said surface charged.

2. In a collecting cell for an electrostatic air cleaner, a first set of conducting plates, a second set of conducting plates, each plate of said second set being coated with a layer of insulating material, a source of power, support means for holding said plates in a spaced parallel manner whereby every other plate is of the other set, and means connecting said sets to said source so that a voltage difference exists between adjacent plates, each of said plates of said second set having a plurality of holes for removing said insulating material from a portion of each plate of the second set whereby a low resistance path is provided to leak an electric charge to the surface of said insulating material.

3. In a collecting cell for an electrostatic air cleaner, a first set of current conducting plates, a second set of current conducting plates, said plates of said second set being covered with an insulating material, spacer means associated with the plates of said first set so that when said plates are assembled with every other plate of the opposite set the plates are parallel and a predetermined space exists between adjacent plates, a voltage source, means connecting said sets to said source whereby a voltage difference exists between adjacent plates, said second set of plates having a plurality of uninsulated areas whereby a low resistance path is provided to leak an electric charge from said conducting plate of said second set to an outer surface of said insulating covering, and means for insulating portions of said plates of the first set which are adjacent said uninsulated areas to increase the resistance between adjacent plates of said first and second set.

References Cited in the file of this patent

UNITED STATES PATENTS

| | | |
|---|---|---|
| 2,817,413 | McDonald et al. | Dec. 24, 1957 |
| 2,841,241 | Eilenberger | July 1, 1958 |

FOREIGN PATENTS

| | | |
|---|---|---|
| 333,901 | Switzerland | Dec. 31, 1958 |